Inventors:
Jacques Bassot
Louis Monselet
by Michael S. Striker
Attorney

United States Patent Office 3,433,207
Patented Mar. 18, 1969

3,433,207
ELECTRONIC CONTROL SYSTEM FOR FUEL
INJECTION SYSTEMS
Jacques Bassot, Paris, and Louis Monpetit, Etang-la-Ville, France, assignors to Societe des Procedes Modernes d'Injection Sopromi, Boulogne, France
Filed Sept. 28, 1967, Ser. No. 671,503
Claims priority, application France, Sept. 30, 1966, 78,307
U.S. Cl. 123—119                    15 Claims
Int. Cl. F02m 51/00

ABSTRACT OF THE DISCLOSURE

A voltage source with a center tap. Injector coils and their control circuit connected in identical branches from end points of voltage source to center tap. Starting thyristors, one for each coil and also one common starting thyristor for each branch, allow current flow through corresponding coils when "injection start" signal is received. Firing of an extinction thyristor in one branch causes series oscillating circuit of injector coil and a capacitor to be connected across the voltage source. Oscillations in the circuit cause extinction of starting thyristors thus interrupting current flow. Capacitors so connected that charge acquired during opening of one injector coil is transferred to next energized injector coil for causing rapid opening of next injector.

Cross-references to related applications

The present invention relates to a control system for ther developments of injection control systems disclosed in our copending application Ser. No. 630,035 entitled, "A High Speed Fuel Injection System," and filed on Apr. 11, 1967, and said copending application is assigned to the assignee of the present invention.

Background of the invention

The present invention relates to a control system for electromagnetic injectors. More specifically, it relates to a control system using thyristors and having capacitive means for the recovery of magnetic energy.

The speed of response of an electronic injection control system is a very important quality, since sufficiently high speed permits both correct angular adjustment for direct or indirect injections and also allows the use of one computer for computing the injection time for a plurality of independent injectors.

However, although it is necessary to supply a high transient power, in order to obtain a rapid opening of the injector, it is desirable, once the injector has opened, to decrease the energy to hold it in the open position.

Summary of the invention

It is the object of the present invention to meet these requirements. The system according to this invention therefore comprises a system for controlling the opening and closing of injection valve means in a fuel injection system, each of said injection valve means having a coil, and being adapted to open upon energization and close upon de-energization of said coil.

The system comprises a voltage source having two end terminals and a center tap, said control system being divided into two identical circuits, each connected from a corresponding one of said end terminals to said center tap. Also comprised are common starting switching means in each circuit for connecting all of said coils in said circuit to said voltage source upon receipt of an "injection start" signal. Furthermore, individual starting switching means, one for each coil adapted to permit current flow in its corresponding coil upon receipt of said "injection start" signal, are also comprised. Each branch also has extinction switching means for causing the current flow to cease in the opposite circuit upon receipt of an "injection stop" signal. Finally, means are provided for storing the energy generated upon interruption of the current in a coil for transfer to a subsequently energized coil at the time of its energization.

Description of the preferred embodiments

Figure 1:
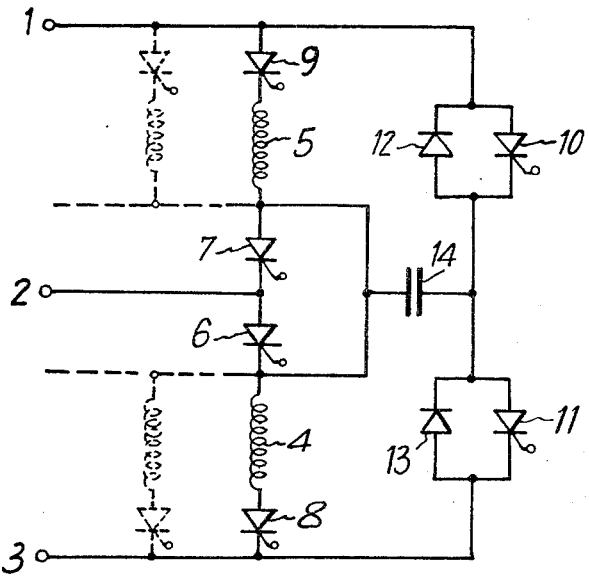
FIG. 1 is an electrical diagram of a system according to this invention.

Referring first to FIG. 1, a system which is not shown allows simultaneous firing of the thyristors 7 and 9, the common and individual starting switching means, respectively, which results in the opening of the injector 5. Thyristor 11, an extinction switching means, is fired at the end of a calculated and controlled time period, by a system which is also not shown here, thus causing:

The extinction of the thyristor 7; a charging of the condensor 14 which constitutes the energy storing means; and the extinctioin of thyristor 9 after a half period.

For the following injector, thyristors 8 and 6 are fired simultaneously. The pulse on the thyristor 6 is maintained for a predetermined time. Firing of the thyristor 8 causes a rapid increase of current in the circuit 14, 4, 8 and 13, thus causing a rapid opening of the injector 4. When the condensor 14 has discharged sufficiently so that the voltage at the cathode of the thyristor 6 is less than $E/2$, injector 4 is kept open by maintaining a reduced power in its coil by supplying half voltage at terminal 2 for the circuit consisting of elements 6, 4, 8.

An extinction switching means, namely thyristor 10, is activated to stop the injection. When thyristor 10 is activated it extinguishes thyristor 6, then thyristor 8, and causes the condenser 14 to charge in the opposite polarity. The circuit is then ready for the following injection by injector 5 (or one of the same set of injectors) with a peak energy supplied by the condenser 14.

The control and regulation circuits contain:
(1) "Injection start" signal distributing means;
(2) A time base generator for calculating the injection time duration as a function of the operating conditions of the motor; and
(3) "End of injection" signal distributing means following the time base generator which causes the alternation between activation of thyristors 10 and 11.

Figure 2:
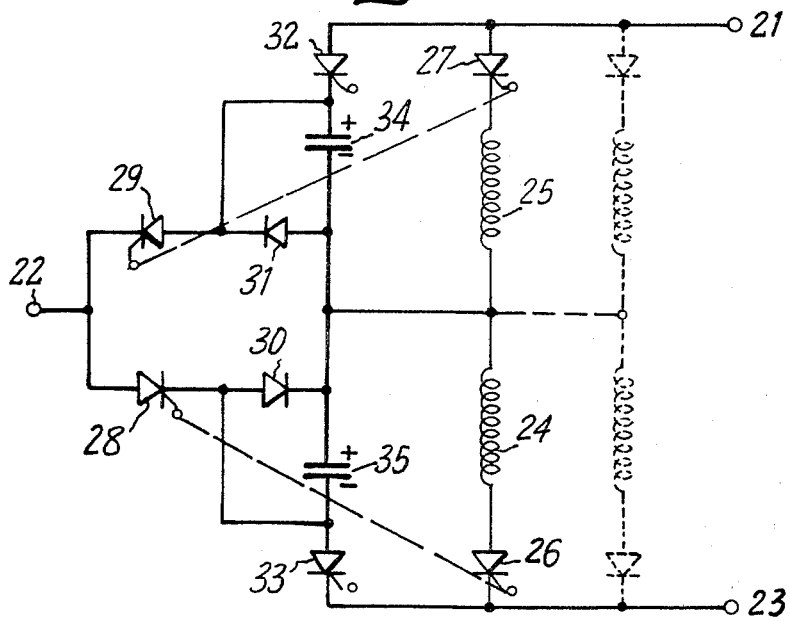
FIG. 2 is an electrical diagram of a second embodiment of the system according to this invention.

FIG. 2 shows an interesting variation of the previous embodiment. Energy to this system is supplied between the points 21, 22 and 23, that is if the point 23 is considered the point of zero potential, point 21 has a potential $E$ and point 22 has a potential $E/2$.

The operation of this arrangement will be described for the case of two independent injectors 25 and 24, but as is shown by the dotted lines on the figure, it is possible to extend the arrangement to any number of injector pairs.

In order to fire the injector 25 of FIG. 2, the thyristors 27 and 29 are simultaneously activated by an arrangement which is not shown. The current in the injector 25 builds up under a voltage of $E/2$ between points 21 and 22 via thyristor 27, the diode 31, and thyristor 29. In order to stop the injection, it is necessary to deactivate either thyristor 27 or 29. In order to accomplish this, by means of an end of injection system which is not shown, the thyristor 33 is activated by applying a voltage to its gate, thus connecting the common point of the two injectors 25 and 24 to point 23 (zero potential) via the condenser 35. The oscillating circuit which is thus formed between points 21 and 23 by means of elements 27, 25, 35 and 33, causes the extinction of the thyristor 29. At the end of a quarter period, the condenser 35 is charged, the thyristors 27 and 33 extinguish in turn. But condenser 35 is charged to a voltage higher than the total supply voltage (substantially to a double voltage). For the following injection by means of injector 24, the thyristors 26 and 28 are fired simultaneously by a system which is not shown. The condenser 35 which was just charged with the polarity indicated on FIG. 2 in the preceding cycle, causes an inverse voltage to appear across the diode 30 so that when the thyristors 28 and 26 are activated, the circuit is established between points 22 and 23 via injector 24 by thyristor 28, capacitor 35 and thyristor 26, so that the energy stored in the condenser 35 causes the injector 24 to open very rapidly. When the voltage across the terminals of condenser 35 has decreased sufficiently to obtain a zero value (direct voltage of the diode 30) the circuit is maintained at reduced power by the elements 28, 30, 24, 26 and 23. In order to cut off injector 24, the same method is used as was used to cut off injector 25, namely thyristor 32 is gated by an "end of injection" system which is not shown. Opening of thyristor 32 causes the closing of an oscillating circuit 32, 34, 24 and 26 between 21 and 23. Supplying voltage to this circuit causes the extinction of thyristor 28 and causes the condenser 34 to charge with the polarity shown on FIG. 2, and finally the extinction of thyristors 32 and 26. The system is then ready for a new injection by means of injector 25, with recovery of the energy from injector 24 which is now stored in condenser 34. Then for the following cycle thyristors 27 and 29 are fired simultaneously, which causes, with recovery of the potential energy contained in 34, the rapid opening of injector 25 and then when that recovered energy is dissipated, injector 25 is maintained in the open condition by means of circuit 25, 27, 31 and 29. The end of the injection is again caused by firing of thyristor 33, and the cycle may be repeated.

It should be noted that one advantage of this arrangement is that even with a control consisting entirely of thyristors, that is of silicon elements which are not fragile, and even with the recovery of energy and opening the injectors under very high voltage and with high energy and then maintaining the injector opened with a reduced energy, this arrangement still does not require the use of symmetrical condensers, that is to say, the transient energy may be stored in condensers of an electrochemical type which are polarized and whose replacement price is extremely low.

Figure 3:
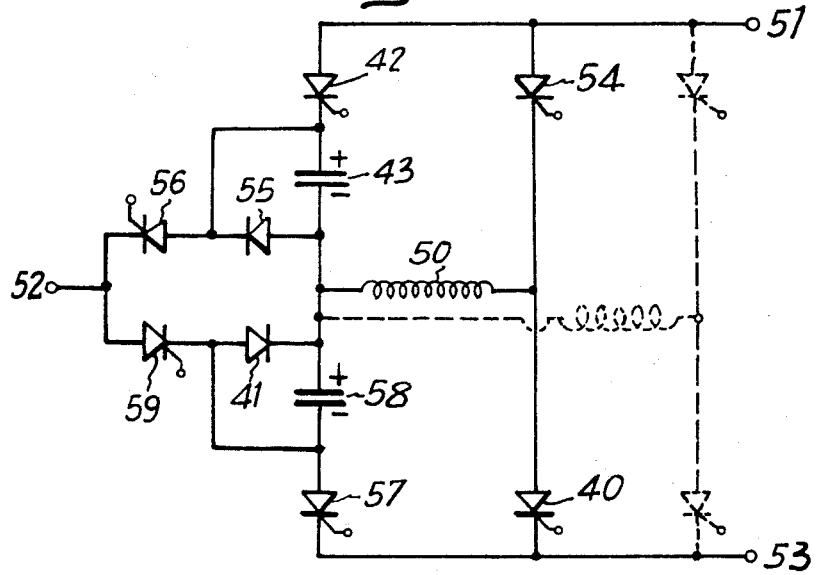
FIG 3 is a modification of the diagram according to FIG. 2.

The circuits which have just been described, under the conditions which were shown, permit the control of an even number of injectors. It is an essential function of such electronic injection control systems to translate data pertaining to the operating conditions of the motor into a controlled and regulated quantity of fuel. The fundamental element, which may be called a transducer, may either be embodied in an injector proper, as was implicitly implied in the preceding discussion, or in a more complex assembly, for example a single injector followed by a mechanical distributor or even by a single injector which feeds a plurality of cylinders following a cycle without angular adjustment. Thus, it would be of interest to be able to obtain the same qualities of energy recovery with a transient high energy supply, and a lower steady state energy supply, in the case of a single injector or an odd number of injectors. A possible embodiment for this is shown in FIG. 3, which shows the case of a single injector, it being obvious that the embodiment may be extended easily to any number of injectors, either even or odd, as indicated by the dotted lines. Energy is always supplied to the system at three points 51, 52 and 53; that is, if zero potential is assumed to exist at point 53, the voltage at point 52 will be $E/2$ and that at point 51 will be E. The injector is represented by the coil 50. As before, the cycle will be described after a nonoperative period. For the first injection, the injector is supplied with a voltage $E/2$ between, for example, points 51 and 52, via thyristor 54, diode 55 and thyristor 56, that is to say the thyristors 54 and 56 are gated simultaneously by means of a system which is not shown. The circuit between points 51 and 52 thus consists of thyristor 54, injector 50, diode 55, thyristor 56. In order to cut off the current which causes the opening of the injector, or, more generally, of the transducer, thyristor 54 and thyristor 56 must be extinguished. Thyristor 56 is extinguished first. In order to do this, thyristor 57 is gated by means of "end of injection" signal distributing means, which are not shown. The oscillating circuit which is thus established between points 51 and 53 by thyristor 54, coil 50, capacitor 58, and thyristor 57 causes the extinction of thyristor 56 and causes condensor 58 to charge with the polarity shown in the figure. It then causes the extinction of thyristors 54 and 57.

For the following injection, also to be applied by injector 50, the voltage between points 52 and 53 is utilized. In order to do this, first the two thyristors 59 and 40 are gated by means of an arrangement which is not shown. The condenser 58 is charged according to the polarity indicated in the figure. Diode 41 is biased in the inverse direction and does not conduct. The circuit is thus an oscillating circuit for one-quarter of a period across thyristor 59, capacitor 58, coil 50, and thyristor 50 between the points 52 and 53.

When the voltage at the terminals of condenser 58 has decreased to a sufficiently low value, diode 41 becomes conductive and injector 50 is maintained under reduced voltage $E/2$, and under reduced power, by the circuit consisting of elements 52, 59, 41, 50, 40 and 53. The opening of the injector was accomplished at higher power by recovery of the energy temporarily stored in capacitor 58 in the complementary circuit after the closing of injector 50 at the time of the previous injection.

In order to extinguish thyristors 51 and 40, the method analogous to that used to extinguish the symmetrical circuit containing thyristors 54 and 56 is used. That is, thyristor 42 is gated by means of a system which is not shown. The gating of the thyristor 42 which connects the common point between diode 41 and coil 50 to the voltage source point 51 by means of thyristor 42 and capacitor 43 causes the extinction of thyristor 59. Capacitor 43 then charges according to the polarity shown in the figure, and thyristors 40 and 42 are extinguished. Condenser 43 therefore is charged in turn with the magnetic energy recovered from the injector 50. At the time of the next cycle, the circuit 54 and 56 is again utilized, but this time as opposed to the first cycle which was described at the beginning of this description, the simultaneous firing of thyristors 54 and 56 causes the opening of injector 50, under the action of the current which flows between points 51 and 52 through thyristor 54, coil 50, capacitor 43 and thyristor 56 until the condenser 43 is sufficiently discharged to allow the diode 55 to conduct. End of the injection is again caused by activating thyristor 57 and the arrangement is ready to continue the cyclic operation.

It should be noted that the system, in the case of an uneven number of injectors or transducers and, more particularly, in the case of a single injector or transducer, again permits the recovery of energy, the steady state low voltage supply and reduced power after a high power opening, as well as the use of cheaper polarized capacitors.

The different embodiments of a control system which have just been described have one characteristic in common, namely the extinction of the power thyristors. That is to say, the stopping of the injection is obtained by energizing an extinction thyristor. As can be seen easily, the cyclic operation of these devices necessitates the application of an "end of injection" signal to the gate of an extinctoin thyristor at the time of one injection and then during the injection controlled by the complementary circuit, the application of the same "end of injection" signal to another extinction thyristor.

It is obvious that two control systems could be used to obtain these complementary extinctions. However, the activation of the starting thyristors, that is, the beginning of the injection, is controlled by a conventional element, preferably a transformer, having an iron core or a core of ferromagnetic material whose excitation is controlled by a known element mounted for example on the cam shaft.

In all these electronic injection systems, the end of the injection is controlled at the end of a certain time period which is calculated in an injection time computer, which takes into account different operational conditions of the motor. It is obvious that it is not desirable to add computer units and that it is preferable to utilize one computer unit in conjunction with means for alternately controlling one or the other of the extinction thyristors. In order to accomplish this, one could of course utilize mechanical relays or switches having elastic membranes, but the use of ferromagnetic cores or ferrite cores permits a very simple solution of the problem.

Figure 4:
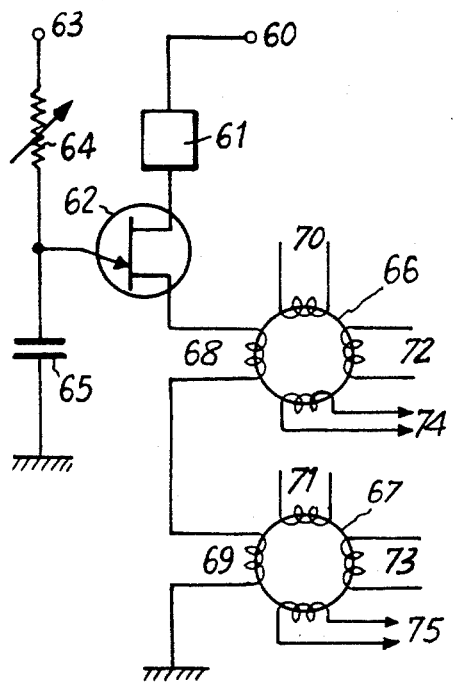
FIG. 4 is an electrical diagram of an extinction control system.
Figure 5:
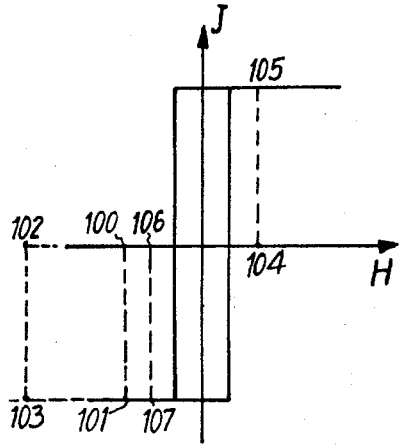
FIG. 5 is a diagram showing magnetic changes in the system according to FIG. 4.

One very simple embodiment using one computer unit is shown in FIG. 4. A unijunction transistor is used as time base generator. FIG. 5 shows a hysteresis loop of a ferromagnetic or ferrite material which may be used in the control cores.

It is the function of this particular device to cause the end of the injection by a system as for example shown in FIG. 2 of the present application. It is thus the problem to gate the thyristor 33 or the thyristor 32 by means of a pulse in order to terminate the injection at the end of an injection time which was calculated by the time base generator. FIG. 4 shows a schematic diagram of a time base generator consisting of a unijunction transistor 62 energized by a positive potential 60 by way of a correction device 61 connected to its second base 2. Point 63 is energized by a device which is not shown at the moment of the start of the injection. A condenser 65 is charged from this point 63 by way of a variable resistance 64. This causes the unijunction transistor to conduct at the end of a certain time period. Coils 68 and 69 which are situated on the cores of the transformers 66 and 67 are in the circuit of the first base of the transistor 62.

For the illustrative case wherein a material having a rectangular hysteresis loop, such as shown in FIG. 5, is used, the biasing coils 70 and 71 are mounted on the cores 66 and 67, respectively. They are fed by a continuous current. Also mounted on the respective cores are auxiliary coils 72 and 73 and control coils 74 and 75. The terminals of each of the latter are connected between the cathode and the gate of thyristors 32 and 33, respectively.

At the moment of the beginning of the injection, voltage applied to point 63 of FIG. 4 starts the time base generation. Biasing coils 70 and 71 are furnished with a continuous current. The current of base 1 of the unijunction transistor 62, that is the current in the coils 68 and 69, is negligible and it may be supposed that in the absence of any other current, the ampere turns of the coils 70 and 71 cause the magnetic state of the two cores 66 and 67 to be that represented by the points 100 and 101 of FIG. 5. At the moment of the opening of the injector, the current passing through injector coil 25, that is the circuit consisting of elements 27, 25, 31 and 29, flows through the auxiliary coil 72, having several turns on the core 66, in such a way that the ampere turns of the magnetic circuit 66 are represented by points 102 and 103 of FIG. 5 for the injector 25, while the absence of current in injector 24 results in the magnetic state of the core 67 being represented by points 101 and 100. At the end of the injection time, that is at the moment where the voltage results from the charge of condensor 65 of FIG. 4 reaches the peak emitter voltage of unijunction transistor 62, this transistor is activated, thus causing a current pulse in coils 68 and 69 which are connected in series. The ampere turns used in this circuit cause a change in the magnetic state of cores 66 and 67; the magnetic circuit 66 for example will pass from points 102 and 103 to points 106 and 107. This variation of applied magnetic field or, of ampere turns applied to the core, does not cause any voltage to be induced in coil 74 and therefore no signal results in the circuit of coil 74 which is connected, for example, between the cathode and the gate of the thyristor 32. However, the pulse which starts in the circuit of base 1 of the transistor 62 and which results in a current in the coil 69 of core 67 causes a magnetic change in the core from the points 101 and 102 to points 104 and 105. This causes the appearance of an electric signal at the terminals of coil 75 of core 67. If this coil is connected at its terminals to the cathode and the gate of thyristor 33, the pulse delivered by the transistor 62 causes the extinction of thyristor 33 and therefore the extinction of thyristor 27.

It is obvious that for the following cycle, when thyristors 28 and 26 are simultaneously energized, points 102, 103 will correspond to the state of core 67 and not of core 66. Thus, when thyratrons 28 and 26 are energized, the "end of injection" pulse delivered by transistor 62 is at this time applied to thyristors 32. The operation of this arrangement may be summarized by saying that the current which flows through the injector 94 or in the case of a single injector, which flows through one of the control circuits of the injector, causes the saturation of one of the two cores which cause the end of the fuel injection. It is always the unsaturated core, that is the core which has only the steady-state ampere turns corresponding to the points 100 and 101, which carries the coil which causes the activation of the extinction thyristor corresponding to the two activated starting thyristors.

What is claimed as new and desired to be protected by Letters Patent is set forth in the appended claims.

1. A system for controlling the opening and closing of injection valve means in a fuel injection system, each of said injection valve means having at least one coil and being adapted to open upon energization and close upon deenergization of said coil, comprising in combination, a voltage source having two end terminals and a center tap, said control system being divided into two identical circuits including said coils, one of said circuits being connected from each of said end terminals to said center tap; common starting switching means in each circuit for connecting all of said coils in said branch to said voltage source upon receipt of an "injection start" signal; individual starting switching means, one for each coil in each branch, adapted to permit current flow in its corresponding coil upon receipt of said "injection start" signal; extinction switching means in each branch for causing said current flow to cease in the opposite branch upon receipt of an "end of injection" signal; and means for storing the energy generated upon said current interruption for transfer to a subsequent coil at the time of its energization.

2. A system as set forth in claim 1, wherein the switching means comprise unidirectional switching means responsive to a control signal.

3. A system as set forth in claim 1 wherein said switching means comprise thyristors.

4. A system as set forth in claim 3 wherein said energy storing means comprise at least one capacitor.

5. A system as set forth in claim 4 wherein said extinction switching means is so connected as to provide a charging path for said capacitor when activated.

6. A system as set forth in claim 5 wherein said common starting switching means are adapted to connect all of said coils to said center tap of said voltage source when energized; wherein said individual starting switching means are adapted to connect each of said coils to the end terminal of said voltage source corresponding to its circuit when energized; wherein said capacitor is connected to said coils in such a manner as to form a series circuit with said coils, said series circuit being connected across said end terminals of said voltage source upon activation of said extinction switching means.

7. A system as set forth in claim 6 also comprising a diode connected in antiparallel with each of said extinction switching means.

8. A system as set forth in claim 7 wherein each circuit is alternately energized to control the coil of an injector.

9. A system as set forth in claim 4 for controlling at least one pair of injectors, and wherein said energy storing means comprise a pair of capacitors wherein said coils are connected in series; wherein said individual starting switching means are each adapted to connect said coils to the corresponding end terminal of said voltage source; wherein said capacitors are connected in series, the common point of said capacitors being connected to the common point of said coils, and wherein each of said extinction switching means is adapted to connect the other terminal of said capacitors to the corresponding side of said voltage source; and wherein each of said common starting thyristors is connected to the common point of said capacitor and said extinction thyristor and the center tap of said voltage source, said system also comprising a pair of diodes each connected in parallel with one of said capacitors.

10. A system as set forth in claim 9 wherein each circuit is alternately energized to control the coil of an injector.

11. A system as set forth in claim 5 for controlling a single coil, wherein said energy storing means comprise a pair of capacitors connected in series; wherein said extinction thyristors are also connected in series and to said pair of capacitors in such a manner that each extinction thyristor is adapted to connect one terminal of said capacitor to the corresponding end terminal of said voltage source upon activation of said extinction thyristor; wherein said individual starting thyristors are also connected in series across said voltage source; wherein said coil is connected between the common point of said capacitors and the common point of said individual starting thyristors; wherein said common starting thyristors are each connected to the common point of said capacitor and said extinction thyristors; and also comprising a pair of diodes, one in parallel with each of said capacitors.

12. A system as set forth in claim 11, for the control of a plurality of coils, also comprising a plurality of additional pairs of individual starting thyristors, one pair for each coil; and wherein each additional coil is connected from the common point of said capacitors to the common point of a corresponding pair of individual starting thyristors.

13. A system as set forth in claim 8 also comprising means for alternately applying said end of injection signal to each of said extinction thyristors.

14. A system as set forth in claim 13 wherein said means for alternately applying said "end of injection" signal to each of said extinction thyristors comprise a time base generator for generating a stop pulse at the end of each injection time; two cores; two series connected coils, one wound on each of said cores, and adapted to receive said pulse; two biasing coils, one for each core, each energized by direct current; a pair of auxiliary coils each connected in series with the coil of a corresponding injector, each wound on one of said cores; and a pair of "end of injection" signal generating coils, one wound on each core, each connected to said extinction thyristor in the opposite circuit, said corresponding injection coil being connected in such a manner that an "end of injection" pulse is generated when said stop pulse passes through said series coils, if no current is flowing in said auxiliary coil of said corresponding core.

15. A system as set forth in claim 14 wherein said cores have rectangular hysteresis loops.

References Cited

UNITED STATES PATENTS

| | | | |
|---|---|---|---|
| 2,815,009 | 12/1957 | Pribble | 123—32 |
| 3,242,352 | 3/1966 | Long | 307—252 XR |
| 3,338,221 | 8/1967 | Scholl | 123—32 XR |

LAURENCE M. GOODRIDGE, *Primary Examiner.*

U.S. Cl. X.R.

307—252; 317—148.5; 123—32